April 19, 1949.   J. R. THOMAS   2,467,638
CONVERTIBLE SEAT STRUCTURE
Filed July 29, 1944   3 Sheets-Sheet 1
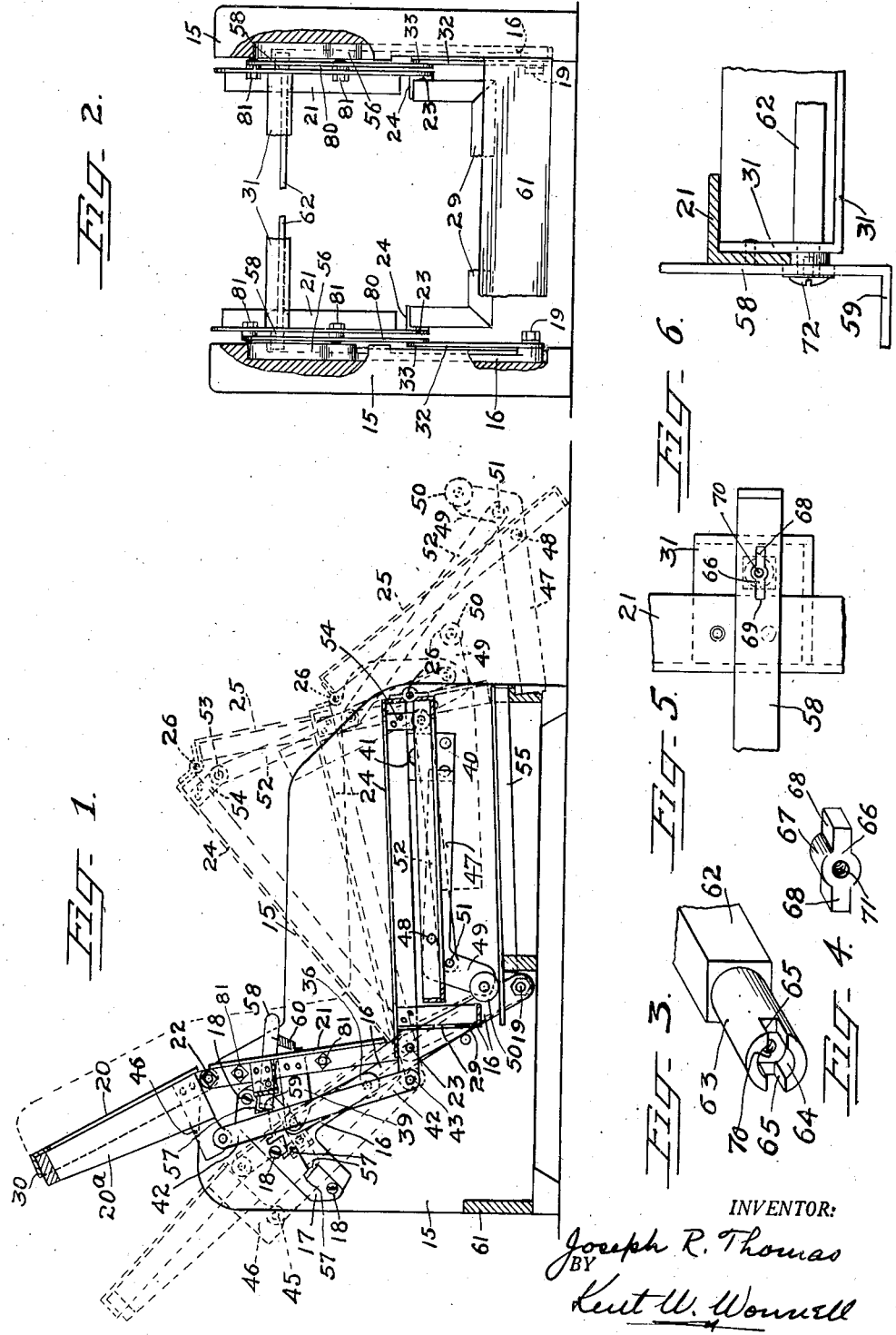
INVENTOR:
Joseph R. Thomas
BY Kent W. Worrell
Atty.

April 19, 1949.  J. R. THOMAS  2,467,638
CONVERTIBLE SEAT STRUCTURE
Filed July 29, 1944  3 Sheets-Sheet 2
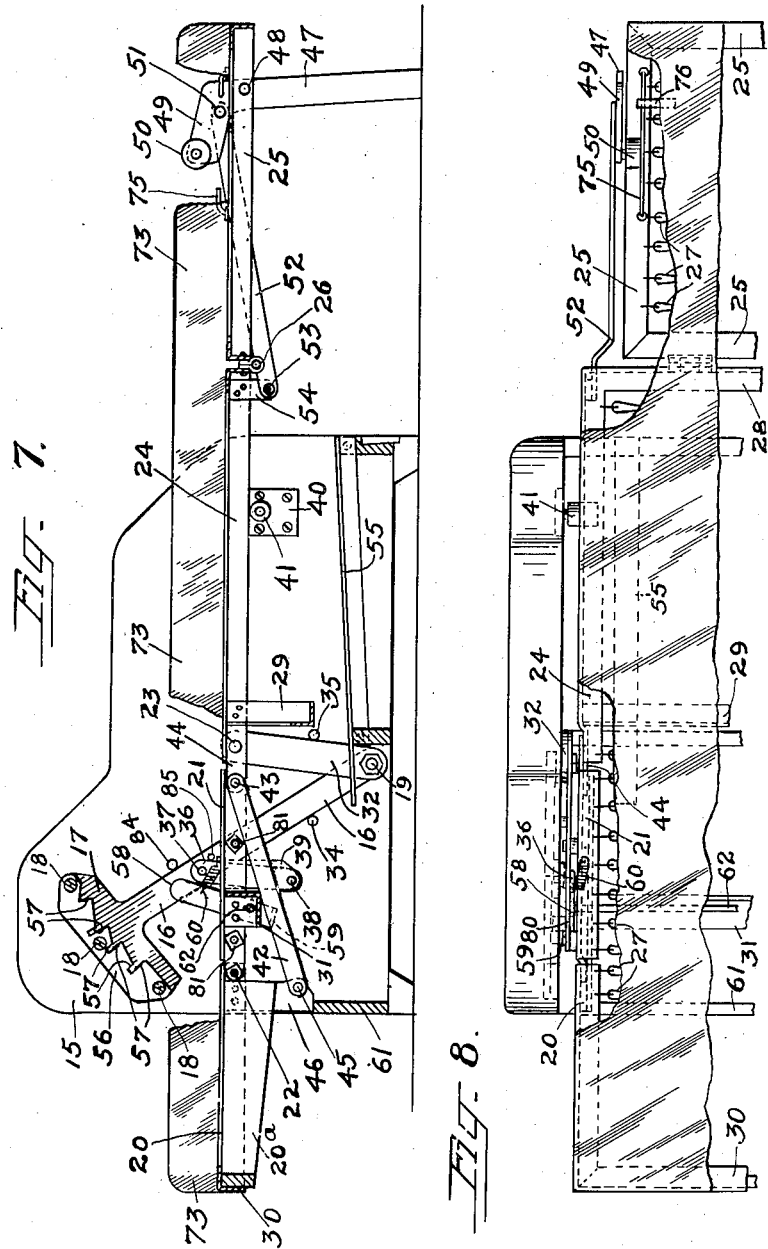
INVENTOR:
Joseph R. Thomas
BY
Kent W. Wonnell
Atty.

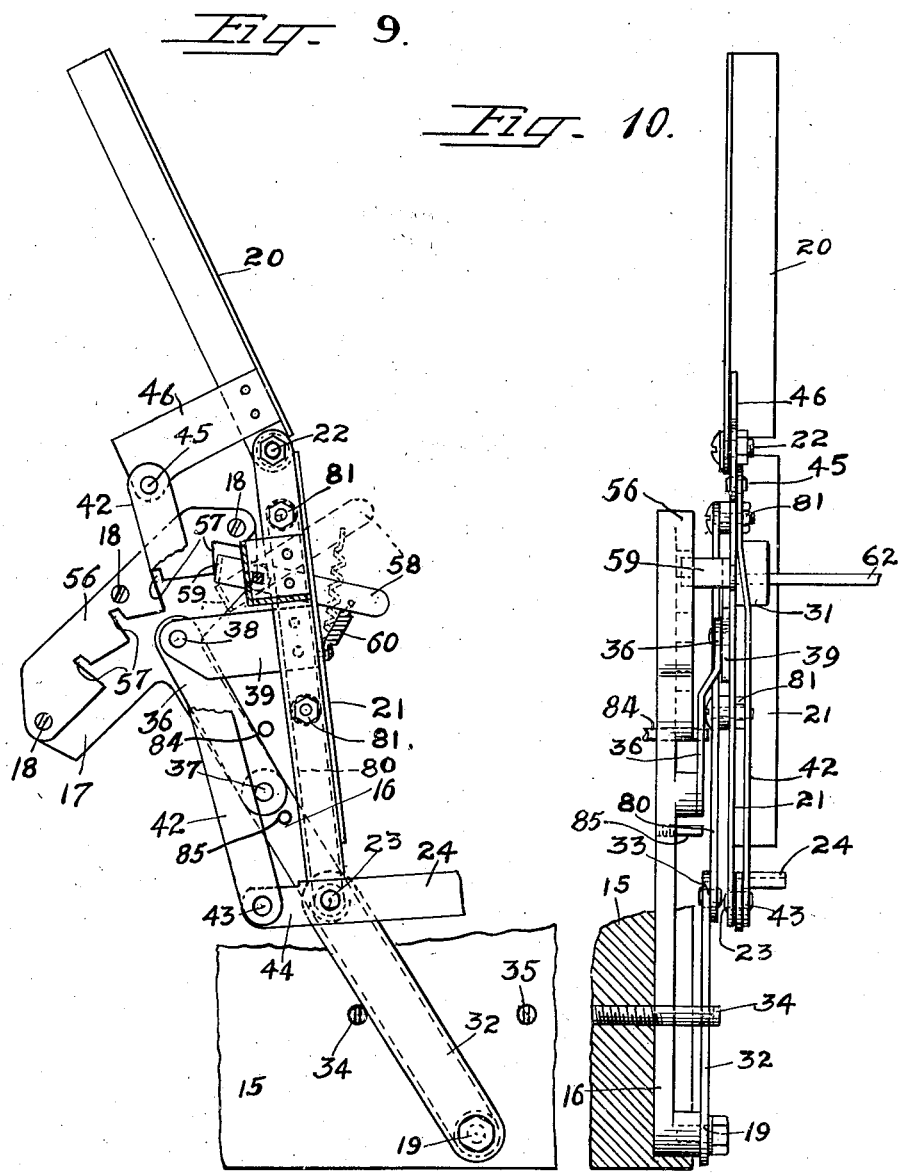

Patented Apr. 19, 1949

2,467,638

UNITED STATES PATENT OFFICE 2,467,638

CONVERTIBLE SEAT STRUCTURE

Joseph R. Thomas, Chicago, Ill.

Application July 29, 1944, Serial No. 547,129

5 Claims. (Cl. 155—49)

This invention relates in general to a folding chair or seat structure having a back adapted to be partially inclined, as in a Morris or reclining chair, having a movable seat and foot structure adjustable separately or in conjunction with the back to provide a reclining seat or chaise-longue effect; and having sections which are movable in horizontal alignment to provide a bed structure.

An important object of the invention is to provide a plurality of connected seat sections adapted to be mounted in end frames to form a chair or seat in one position, and to provide an adjustable back with portions thereof movable with respect to each other.

A further object of the invention is to provide a compact folding seat structure in which one of the sections is hinged to the front of the seat section and is foldable thereunder in compact relation when the sections are erected to form a seat.

A still further object of the invention is to provide a folding seat structure which has an adjustable back and mounting means for attaching all of the sections as a unit at the inside of the end frames.

A further object of the invention is to provide an adjustable back structure which may be operated from the inside of the seat to assume any one of a number of different inclined positions.

A further object of the invention is to provide a convertible seat structure having a sectional or continuous mattress applied thereto with a slidable arrangement at one end to provide a smooth cover for the front of the structure when used as a seat.

A further object of the invention is to provide a convertible seat structure composed of a plurality of sections arranged for joint and separate operations and movable from a chair or seat position to a horizontal or bed position.

Other objects of the invention will appear in the specification and will be apparent from the accompanying drawings in which, Fig. 1 is a sectional view showing the connected bed and seat sections, in accordance with this invention, in folded or seat position at one end of the structure;

Fig. 2 is a rear view showing two end frames with parts broken away and to show the connections between the parts shown in Fig. 1 as applied to both ends of the seat;

Fig. 3 is a perspective of one end of the lock operating bar;

Fig. 4 is a perspective of a lock nut to be used with the bar;

Fig. 5 is an end view showing the locking latch which is connected to the end bar;

Fig. 6 is an assembly detail of the latch mechanism;

Fig. 7 is a sectional view of the bed and seat sections extended in horizontal position to form a bed;

Fig. 8 is a partial plan view of the structure as shown in Fig. 7 with parts of the mattress broken away for clearness;

Fig. 9 is an enlarged elevation of the back operating structure; and

Fig. 10 is a rear view of the structure shown in Fig. 9.

Adjustable seat structures of this class may be used for individual chairs or wider seats; they may be used as convertible furniture, for beds and seats; and they are also designed and intended to be adapted for use as reclining seats in railway, motor coaches, and the like.

The present invention differs from other convertible seat structures in providing a back composed of sections separately adjusted with respect to each other and as they are variously inclined; in providing a compact seat structure in which one of the sections it attached to and foldable under the seat, but is extensible at an angle, or in front of the seat to form a bed; and in providing a foldable seat structure adapted to receive a continuous mattress or cushion which has a sliding engagement with one of the sections to adapt it for movement with respect thereto.

Referring now more particularly to the drawings, this seat structure as described is mounted upon and between two end frames 15 which may be upholstered or made of wood or any other suitable material depending somewhat upon the use or application of the furniture.

The foldable seat structure is attached at the insides of the end frames, each end of the seat structure having a mounting strip 16 with an attached or integral end 17 applied to the inside of one end frame and secured in place by fastening screws 18 and a pivot bolt 19, or by other suitable fastening devices.

The folding seat structure comprises a divided back having upper and lower sections 20 and 21 hinged together by means of a pivot 22. The lower end of the lower section 21 is connected by a pivot 23 with a seat section 24. Connected to the front end of the seat section is a foot or under the seat section 25 connected thereto by a hinge 26.

Each section extends entirely between the end frames 15, the two end structures being substantially the same as shown in Fig. 1 and each of the sections having a supporting or link fabric 27 as shown in Fig. 8 but being generally omitted.

The seat section has a bracing cross piece 28 at the front, and a depending brace 29 at the rear; the upper section of the back has a cross rail 30 at the top; and the lower section of the back has a cross rail 31 which opposes the pull of the fabric 27.

In order to mount the connected sections in the end frames, a main link 32 is pivotally secured at its lower end by the fastening bolt 19 and at its upper end is preferably connected for assembly or mounting purposes to a section mounting plate 80 which has fastening bolts 81 for detachably connecting it at one side of the folding structure to one of the folding sections, preferably to the lower back section 21. One end of the mounting plate 80 overlaps the connection of section 21 with the seat section 24 where a pivot 33 is provided for mounting this link 32 directly opposite and in line with the pivot 23 which connects sections 21 and 24. Another supporting link 36 is connected at one end to a pivot 37 supported by mounting strip 16 and at the other end it is connected by means of a pivot 38 with a projecting plate 39 which is rigidly attached to the mounting plate 80.

Inserted at the side of the mounting strip 16 is a stop 34 for limiting the movement of the link 32 in one direction, and inserted in the frame at the other side of the strip is a stop 35 for limiting the movement of the link 32 in a forward direction, thus supporting the seat section in both positions.

Adjacent the front of each end frame is a mounting plate 40 carrying a roller 41 for engaging the lower edge of the seat section 24 at each side thereof and supporting it in seat position and also supporting this section in bed position.

Connecting the upper section 20 of the back for movement with respect to the lower section and also to the seat section is a link 42 having a pivot 43 at one end connected to the extremity of an extension 44 of the seat section which projects rearwardly from the pivot 23 and the other end of the link being connected by a pivot 45 with a fixed bracket plate 46 projecting rearwardly from the upper section 20 of the back adjacent its pivot 22. The fixed plate 46 may also engage a rear cross board 61 of the frame to provide an additional support for the upper back section in bed position.

The back comprising sections 20 and 21 is thus supported by the links 32, each connected to the lower end of mounting plate 80 and by links 36 each connected to the projecting plate 39 attached intermediate the ends of the mounting plate 80 which in turn is attached at the side of each lower back section 21, so that these two links 32 and 36 at each end constitute the swinging support for the back and seat sections.

The relation of these parts is such that when the back is raised to its full position as shown in Figs. 1 and 9, the two sections 20 and 21 are at a slight angle to each other projecting forwardly at their pivotal connection to provide a support which is shaped somewhat to fit the back of a person and to provide a more comfortable support in seat position. As the back section is swung downwardly, the leverage and connection of the link 42 gradually swings the outer back section 20 relatively to the lower section 21 so that when in horizontal position as shown in Fig. 7, these two sections are in alignment.

The foot or under the seat section is provided at each side with a supporting leg 47 connected to section 25 by a pivot 48. The upper end of each leg has an inclined or bell crank portion 49 upon which a roller 50 is mounted. Connected to the upper portion of the leg by means of a pivot 51 is a link 52, the other end of which is connected by a pivot 53 with a bracket 54 secured to the under side of the frame portion of the seat section 24 adjacent the hinge 26.

Disposed below the seat in each side frame is a track or guide 55 adapted to engage the roller 50 when foot section 25 is turned inwardly below the seat, the engagement of the roller supporting and facilitating the movement of the sections into and out of the frame in changing the structure from a seat to a bed or from a bed to a seat.

To adjust and hold the back in any one of a number of inclined positions, a latch plate 56 is secured to or forms a part of each mounting plate 17 and has a plurality of engagement slots 57. A latch 58 is pivoted on each end of supporting cross rail 31 which extends below the lower back section 21, and the latch has an angular projection 59 for engaging any one of the slots 57 when the back is correspondingly moved into position for it to do so. The latch is resiliently held by a spring 60 connected at one end to the outer end of the latch and at the other end to the lower section 21 so that the spring tends to hold the latch extremity 59 in a position to engage one of the slots, the latch being moved against the spring to release it from engagement with any forward slot for tilting the back in a more angular rearward position. When it is desired to move the back forwardly from a rear inclined position, the latch extremity 59 must first be disengaged from its slot 57. Thus the slots lock the back against accidental movement in either direction.

If a latch structure is provided at each side of the seat structure, it is necessary to mount the two latches for joint movement. A suitable construction for this is shown more clearly in Figs. 2 to 6. A rod 62 may be formed with a circular pivoting portion 63 at each end which is inserted through a circular hole in the cross piece 31, the circular portion extending beyond the cross piece to also engage the under or inner side of the latch lever 58. In each end of the pivoting rod is a circular opening 64 and a transverse slot 65 for seating a key 66 therein having a circular portion 67 and opposite projections 68 for engaging in the slots 65, the key when seated in the slot 65 projecting beyond the end of the rod substantially the thickness of the locking latch 58. The latch is also provided with a recess 69 for receiving the locking key 66 therein so that when thus assembled, each latch 58 is keyed to the rod 62 and rotates therewith. In order to secure the parts together, each end of the rod 62 has a threaded hole 70, the key 66 has a threaded opening 71 therethrough, and a screw 72 is inserted from the outside of the latch lever through the key 66 and into the threaded hole 70, thus securing all of the parts together.

A mattress 73 having a plurality of sections or comprising a single continuous section is of sufficient length to cover all of the folding sections in extended position to form a bed. This mattress may be of sponge rubber or any suitable material which will flex readily to conform to the shape of the sections when in seat form and also in forming a bed. The portion which covers the back and seat sections is secured thereto by fastening clips, straps or any other suitable well known means attached to nailing strips such as 20a secured to back section 20.

For the portion of a continuous mattress supported by the foot or under the seat section 25, it is necessary to provide a sliding or slip connection to permit a movement of this end of the mattress relative to section 25 in folding, because of the rounding of the mattress over the bend and hinged end of the seat and under the seat section at the front of the seat structure in seat position. To permit this relative sliding movement, a slide wire 75 is mounted at each side of the section 25 which is adapted to engage a strap or loop 76 at the under side of the mattress permitting the end of the mattress to slip or move relatively to the outer or under end of the section 25 when this section is folded under the seat section in forming a seat. This movement of the mattress is automatic and requires no attention in adjusting the seat or in changing it from a seat to a bed or from a bed to a seat. It also prevents the mattress or seat cover from dropping away from the end section in folded or seat position.

Instead of the folding seat structure being connected to the mounting plate 80, the mounting plate may be omitted. In this case, the upper end of the link 32 will be connected directly by the pivot 23 to the lower end of the lower back section 21, omitting the pivot 33. Likewise the plate 39 secured to the mounting plate 80 intermediate its ends will be connected in the same location to the lower back section 21, instead of to the mounting plate 80, and the mounting plate 80 will be disconnected by omitting its fastening bolts 81.

The advantage of the mounting plate structure is that all of the mounting parts including the attachment plates 80 and the mounting levers 32 and 36 may thus be applied to the insides of the end frames, before the folding seat structure is applied thereto and then any folding seat structure may be easily or detachably connected in the end frames simply by connecting the attachment plates 80 on each side with the seat sections 21 by means of the attachment screws or bolts 81.

In the actual operation of the structure, it is found desirable to add a stop 84 at one side of each mounting member 16 which engages link 36 for limiting the movement of the back structure in the forward direction and another stop 85 secured directly to the mounting member 16 for engaging the lever 36 and limiting its movement in the other or bed position as shown in Fig. 7. This is in addition to the stops 34 and 35 which limit the movement of the main supporting links 32.

With this construction, the back may be adjusted from either side of the seat by raising either latch 58 against its spring 60 which will permit the two back sections to be swung rearwardly to one of the next engaging notches 57. If the structure is to be changed into a bed, the latch is simply held out of engaging position until the back structure has passed beyond the latch plate 56. In changing the structure from a seat to a bed, the front of the seat is normally raised and swung slightly upon link 32, the foot section 25 at this time riding forwardly on the tracks 55 because of the engagement of the rollers 50 therewith. When the front of the seat section is sufficiently raised, the end, or under the seat section may be grasped and swung outwardly therefrom into alignment.

If it is desired to stop the foot section at some intermediate position as shown in Fig. 1 with the outer edge in contact with the floor or the frame and with the back partially raised, a chaise-longue effect may be obtained, but if it is desired to form a bed, the back is released by the latch and the seat and under the seat section are extended forwardly until they are in alignment as shown in Fig. 7 at which time the links 52 will automatically position the legs 47 in supporting position. At this time the front of the seat section will be supported by rollers 41 at each side thereof, the rear of the seat section will be supported by the links 32, the rear of the lower back section will be supported by the links 36, and front of the top back section will be supported by the engagement of bracket 46 with the upper edge of the back cross piece 61 and by link 42.

In returning the structure to seat position from bed position, the end or front section 25 is engaged at the outer end and it and the seat section are raised into a position such that when the foot section is swung inwardly about its hinge 26, the rollers 50 will engage upon the front of the track 55. The raised front end of the seat is then pushed inwardly swinging it rearwardly upon links 32, causing the back sections to be swung upwardly upon links 42 until the latches 58 engage with one of the slots 57. The folding and movement of the back sections is therefore controlled in part and automatic in part; the adjustment of the under the seat end section is also controllable in part, with the seat section, but the folding action is automatic; and the adjusting movement of the mattress is preferably automatic.

It will be noted that when the construction is in upright seat form, the upper portion of the back section slopes away from this junction with the lower section, so that the head of an occupant is free to turn. As the back is inclined downwardly, the two sections project more closely to an aligned position so that the head rest or upper portion of the back raises as the back goes down or approaches the horizontal position, thus causing the back sections to conform to the back of the occupant and making the back of the chair more comfortable in any position.

It may be desirable to vary the relative movement of the back sections as they are inclined by altering the ratios of lengths of the connected links, so that the sections may make various angles with each other as the entire back is inclined or moved, and may reach an aligned condition at any desired stage of their movement with respect to the seat.

I claim:

1. A convertible seat structure, comprising a plurality of connected sections movable from a substantially upright seat position to a horizontal position, the back of the seat comprising two sections hinged together and inclined outwardly at their juncture in seat position, and means connecting these sections for automatically moving the back sections into alignment when they are lowered into horizontal position.

2. In a convertible seat structure, a plurality of connected sections movable from an upright seat position to a horizontal bed position, the back of the seat comprising two hingedly joined sections inclined outwardly at their juncture, a link connection between the outer back section and the section forming the seat for moving the back sections progressively into alignment as the back is swung rearwardly, latch means connected at opposite sides to the lower back section, a notched plate fixed at the side of the seat structure at each end of the sections for engaging the latches, and a keyed connection between the latches at opposite sides of the sections for moving both of the latches when either one is moved.

3. A convertible seat structure, comprising a pair of connected end frames, a mounting member attached at the inner side of each end frame, a notched lock plate secured to the member, a pair of mounting links connected to the member, a section mounting plate connected to the other ends of each of the links, a plurality of connected seat and bed forming sections mounted to move from a seat position to a horizontally aligned bed position and means for connecting one of the sections to the section mounting plate, a latch lever connected with one of the sections and engageable with the notch plate of the end frame for holding one of sections in inclined position within the frame, and means projecting inwardly from the end frames for engaging and supporting the sections when they are extended in bed position.

4. A convertible seat structure, comprising connected back seat and end sections, the end section being hinged to the front of the seat and folding thereunder, means mounting the sections for relative movement from seat to horizontal position, a mattress connected to the back and seat section and overlying all of the sections when extended into horizontal position, and a movable connection between the mattress and the end section which permits the mattress to slide along the end section when the latter is swung under the seat section and retains the mattress in contact with said end section.

5. In a convertible seat structure, a plurality of connected sections, means for mounting the sections to move from a seat position to a horizontally aligned bed position, said structure comprising back, seat and end sections, an automatic folding link and leg structure connected to the seat and end sections and moved by swinging the end section with respect to the seat section, the leg structure comprising a mounting and supporting roller which extends at the side above the end section in bed position, a track below the seat section for engaging the roller of the folding leg structure in inverted position below the seat, an upholstered seat cover forming a mattress in bed position, the seat cover being secured to the back and seat sections and having a sliding connection with the end section for relatively moving this portion of the mattress when the sections are folded to form a seat, the connection comprising a guide bar secured to the end section and a strap secured to the under side of the upholstered seat cover for engaging the guide bar.

JOSEPH R. THOMAS.

REFERENCES CITED

The following references are of record in the file of this patent:

UNITED STATES PATENTS

| Number | Name | Date |
| --- | --- | --- |
| 278,241 | Krill | May 22, 1883 |
| 507,921 | O'Brien | Oct. 31, 1893 |
| 663,582 | Robbin | Dec. 11, 1900 |
| 711,412 | Archambeault | Oct. 14, 1902 |
| 788,656 | Laudkamer | May 2, 1905 |
| 1,200,909 | Andren | Oct. 10, 1916 |
| 1,349,227 | Shkor | Aug. 10, 1920 |
| 1,369,834 | Nelson | Mar. 1, 1921 |
| 2,011,870 | Perlesz et al. | Aug. 20, 1935 |
| 2,187,713 | Bowersox | Jan. 16, 1940 |
| 2,213,590 | Parry | Sept. 3, 1940 |
| 2,240,204 | Bell | Apr. 29, 1941 |

FOREIGN PATENTS

| Number | Country | Date |
| --- | --- | --- |
| 10,205 | Germany | July 2, 1880 |